United States Patent [19]
Koberlein

[11] Patent Number: 5,452,768
[45] Date of Patent: Sep. 26, 1995

[54] GAUGE DEPTH CONTROL FOR SOIL TILLAGE IMPLEMENT

[75] Inventor: Ross D. Koberlein, Brownstown, Ill.

[73] Assignee: Worksaver, Inc., Litchfield, Ill.

[21] Appl. No.: 136,868

[22] Filed: Oct. 18, 1993

[51] Int. Cl.⁶ .......................... A01B 49/02; A01C 23/02
[52] U.S. Cl. .................. 172/76; 111/140; 172/78; 172/156
[58] Field of Search .................. 111/52, 139, 140, 111/134, 135, 924, 926, 927; 172/76, 78, 156, 166, 182, 196, 484, 574, 413, 624, 624.5, 647, 657, 421, 395, 396, 423, 424

[56] References Cited

U.S. PATENT DOCUMENTS

| | | | |
|---|---|---|---|
| 835,031 | 11/1906 | Myers | 111/140 X |
| 2,849,969 | 9/1958 | Taylor | 111/140 X |
| 3,799,079 | 3/1974 | Dietrich | 111/140 X |
| 4,196,679 | 4/1980 | Moore | 111/140 X |
| 4,750,441 | 6/1988 | Pfenninger et al. | 111/140 X |
| 4,819,737 | 4/1989 | Frase | 172/166 X |
| 4,834,189 | 5/1989 | Peterson et al. | 172/166 |
| 5,027,724 | 7/1991 | Ptacek et al. | 172/166 X |
| 5,080,178 | 1/1992 | Dietrich, Sr. | 172/196 X |

Primary Examiner—Randolph A. Reese
Assistant Examiner—Robert Pezzuto
Attorney, Agent, or Firm—Paul M. Denk

[57] ABSTRACT

A soil tillage implement to be pulled behind a tractor having a conventional frame with one or more furrowing elements depending from the frame or plough share. Each furrowing element has a disc-like coulter, a shank, and a replaceable plough share mounted on the soil engaging end of the shank. One or more gauge wheels, which can be adjusted to vary the height of the implement from the soil so as to adjust the depth of the tillage extending down from the frame. Each gauge wheel employs a counterbalance spring assembly to support the weight of the gauge wheel during adjustment.

2 Claims, 2 Drawing Sheets

GAUGE DEPTH CONTROL FOR SOIL TILLAGE IMPLEMENT

BACKGROUND OF THE INVENTION

This invention relates generally to a farm implement, more specifically, to an improvement in the construction of the gauge wheel assembly of a soil tillage implement.

Soil tillage implements are well known to the art. For example, various configurations of ploughs have been known for centuries. Basically, a plough consists of a triangular beam or frame that is removably connected to a power source, such as a horse (as in the pioneer days) or tractor that pulls the device through the field or soil that is to be ploughed or cultivated. Connected to and depending from the frame are generally a series of furrowing elements designed to cut into the ground and till the soil. The furrowing elements generally are comprised of a plough share, which is the blade-like element that slices into the soil and is usually formed on the tip of a mouldboard, a broader, curved blade-like member behind the share that lifts and turns the soil or pushes the soil to one side so as to create the furrow. In front of each share is the coulter or knife, most often a disc-shaped knife disposed to cut a vertical slit in the soil ahead of the share and mouldboard to facilitate the movement of the plough share through the soil.

In use, the frame of the implement is generally balanced or supported by one or more adjustable ground wheels. The ground wheels, also known as gauge wheels, extend downward from the frame from a shank that can be adjusted, i.e, lengthened or shortened, to vary the height of the implement from the ground and thereby vary the depth which the coulters and plough shares cut into the soil.

With prior art implements, there is no easy or convenient way to adjust the length of the shaft of the gauge wheel. For example, the gauge wheels are quite heavy and nearly impossible for one farmer to adjust alone. It usually takes two workers to adjust them. When a wheel shank is released from the frame, the wheel drops down under its own weight. One worker has to hold the wheel in place and attempt to align holes in the wheel shank and with holes in the frame while the other worker inserts the adjustment pin through the holes to lock the wheel in the desired position.

SUMMARY OF THE INVENTION

It is, therefore, a principal object of the present invention to provide a counterbalance spring between the implement frame and the gauge wheel to support the wheel when the adjustment pin is removed so that one user can raise and lower the wheel and align the adjustment pin holes.

Another object of the invention is to provide a counterbalance spring assembly which can be retrofitted to a soil tillage implement.

Briefly stated, a soil tillage implement is provided having a conventional frame with one or more furrowing elements depending from the frame. Each furrowing element consists of a disc-like coulter, a shank, a plough share replaceably mounted at the soil engaging end of the shank. One or more adjustable gauge wheels which can be adjusted to vary the height of the implement from the soil so as to adjust the depth of the tillage of the coulters and shares, extend downward from the frame. The gauge wheels employ a counterbalance spring assembly to support the weight of the gauge wheel during adjustment so as to allow easy adjustment by one user.

DESCRIPTION OF THE PREFERRED EMBODIMENT

Figure 1:
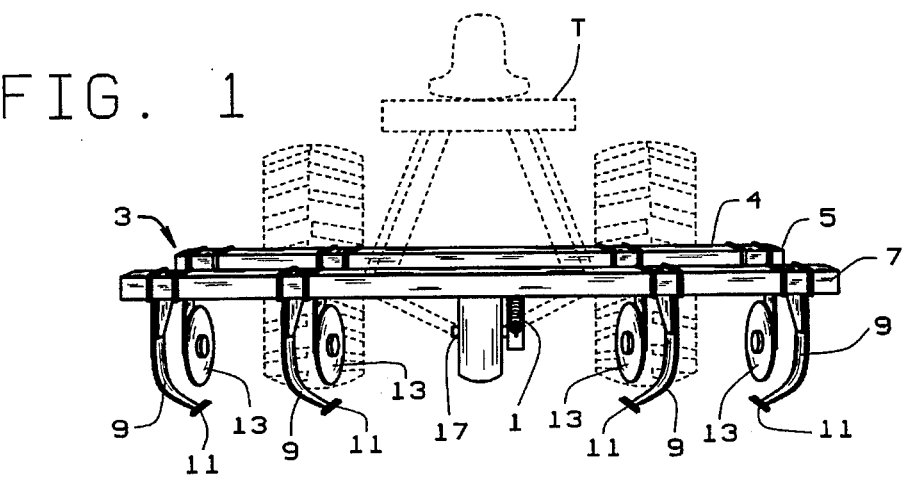
FIG. 1 is a single-shank, four-row tillage implement having one gauge wheel employing the counter-balance spring assembly of the present invention, a tractor is shown in phantom to illustrate environment.
Figure 2:
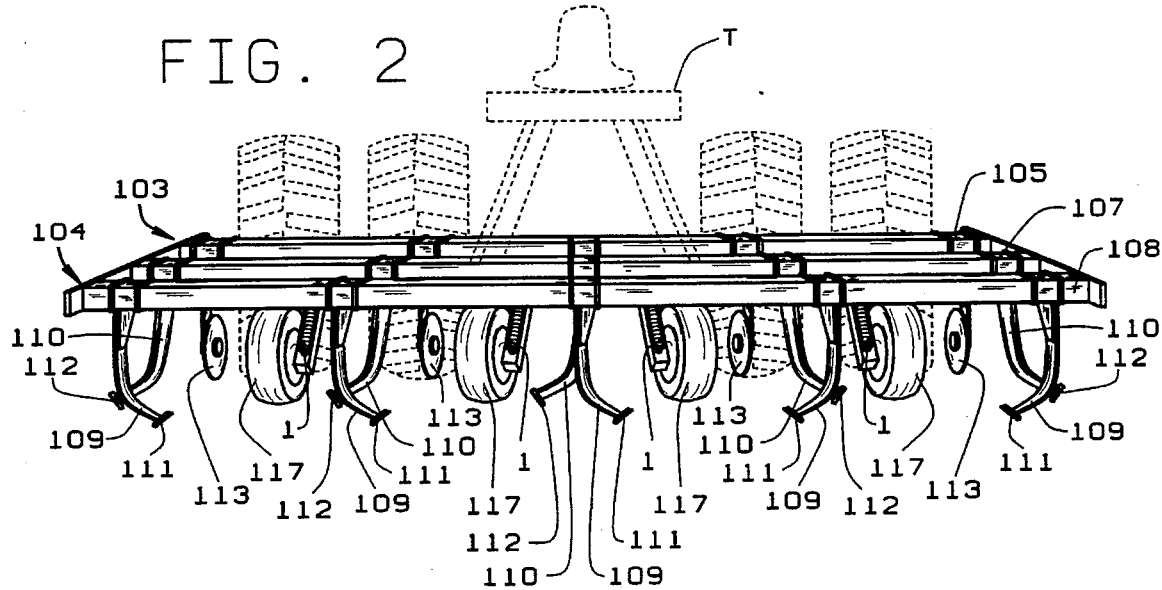
FIG. 2 is a double-shank, five-row soil tillage implement having four gauge wheels, each gauge wheel employing the counter-balance spring assembly of the present invention, a tractor is shown in phantom to illustrate environment.
Figure 3:
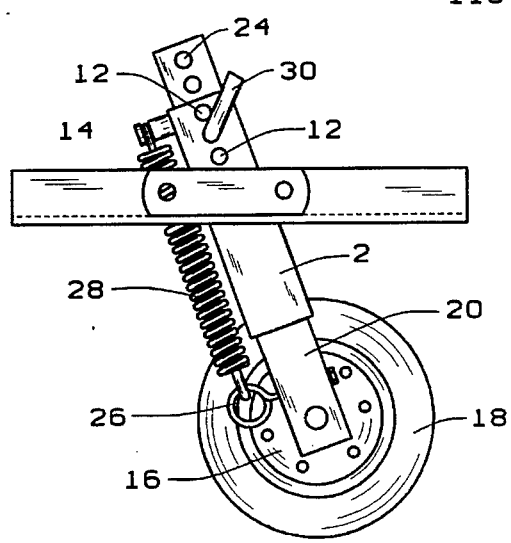
FIG. 3 is a side elevation of a gauge wheel employing the counter-balance spring assembly of the present invention.
Figure 4:
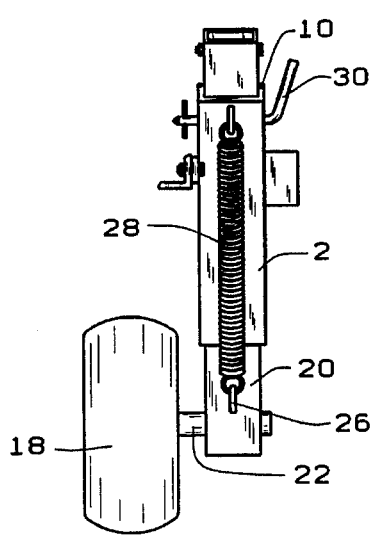
FIG. 4 is a rear elevation of a gauge wheel employing the counter-balance spring assembly of the present invention.

The gauge wheel counter-balance spring assembly of the present invention is shown generally by reference numeral 1 in FIGS. 1 and 2.

FIGS. 1 and 2 illustrate assembly 1 as used with conventional soil tillage implements. FIG. 1 shows the soil tillage implement 3 mounted to the rear of a power source, here a conventional tractor T. Implement 3 has a frame 4 comprised of a pair of beams 5 and 7. A plurality of plough share shanks, as at 9, extend down from beam 7. Each shank terminates with a removable soil engaging plough share 11. A plurality of disc coulters 13 extend down from beam 5 in front of plough share 11. An adjustable ground wheel assembly 17, also known as a gauge wheel extends down from frame 4.

FIG. 2 shows a soil tillage implement 103 having a frame 104 comprised of transverse beams 105, 107 and 108 mounted to the rear of a power source, here shown as a tractor T. Implement 103 provides a double-shank per row assembly with a plurality of shanks 109 terminating in removable plough shares 11 extending down from beam 108. Opposite shanks, shown as 110, extend down from beam 107 and terminate in removable plough shares 112. A plurality of disc coulters 113 extend down from beam 105 in front of shares 11. A series of ground wheel assemblies, also known as gauge wheels, employing counter-balance spring assembly 1 of the present invention, are attached to and extend down from frame 104.

It should be noted that the tillage implements, 3 and 103, are conventional and are illustrative only. The counter-balance spring assembly of the present invention, as will be described hereinafter, may be employed on any tillage implement or farm implement requiring the use of one or more gauge wheels without departing from the scope of the invention.

The counter-balance spring assembly 1 of the present invention is best illustrated in FIGS. 3–7. Sleeve 2 is bolted or appropriately attached to a mounting member 6 which is bolted or otherwise appropriately attached to a frame. Sleeve 2 is a square tube having walls that define channel 10. Sleeve 2 has a plurality of holes, as at 12 formed therethrough at an upper end. A spring mounting stud 14 extends outward from the rear wall of sleeve 2.

Wheel 16, with a conventional tire 18 mounted thereon, is rotatably connected to wheel shank 20 by axle 22. Wheel shank 20 has a plurality of holes 24 formed therethrough at an upper end. Eye bolt 26 is appropriately attached to shank 20 and extends outward from shank 20 parallel to stud 14. Spring 28 is attached between stud 14 and eye bolt 26. Adjusting pin 30 is removably inserted through holes 12 and 24 in sleeve 2 and shank 20 respectively.

It should be noted that stud 14, eye bolt 26 and spring 28 can be retrofitted to implement in the field.

Figure 5:
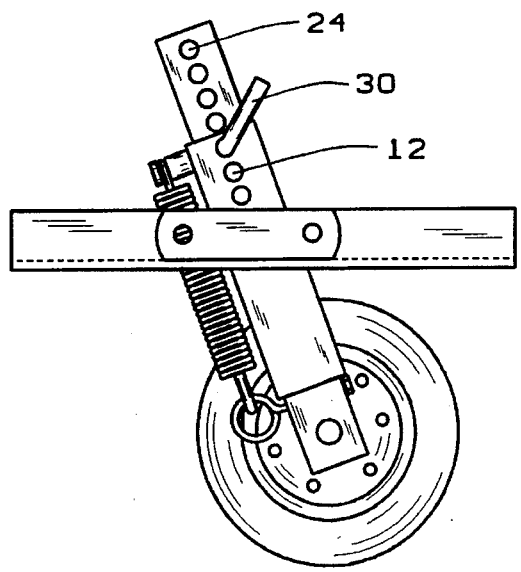
FIG. 5 is a side elevation of a gauge wheel employing the counter-balance spring assembly of the present invention in a retracted position.
Figure 6:
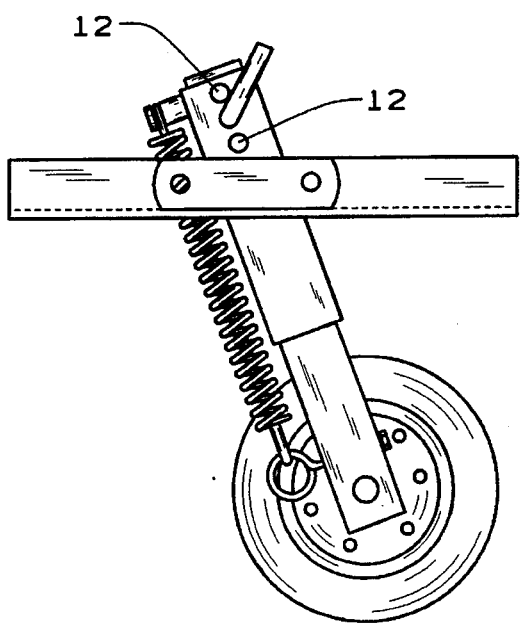
FIG. 6 is a side elevation of a gauge wheel employing the counter-balance spring assembly of the present invention in a fully extended position.
Figure 7:
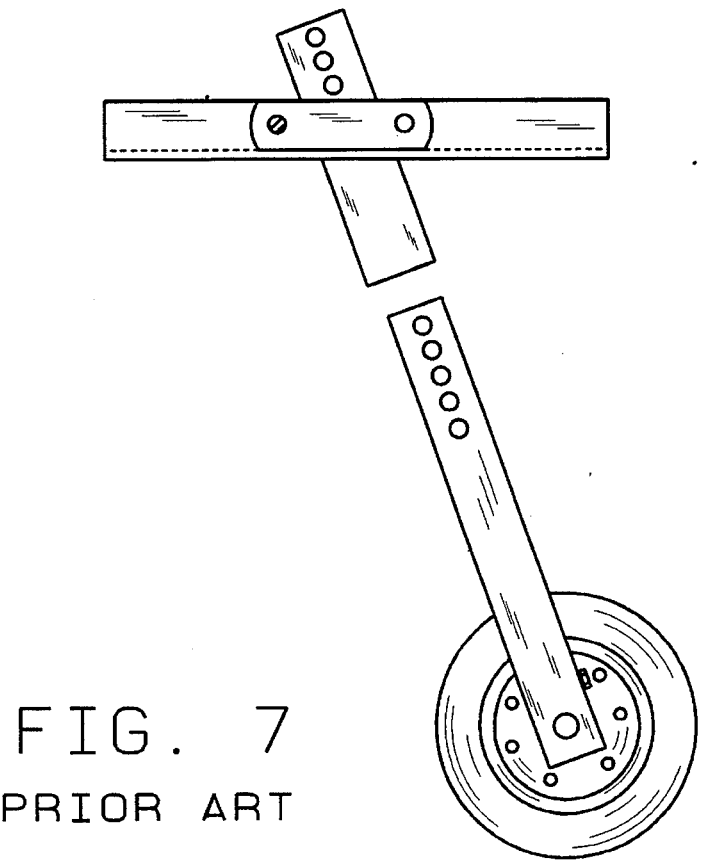
FIG. 7 is a side elevation of a prior art gauge wheel.

As best illustrated in FIGS. 5 and 6, the distance between the ground engaging tire 18 and the frame can be changed by sliding shank 20 within channel 10 in sleeve 2. Pin 30 is removed and spring 28 holds shank within sleeve 2 so that shank 20 can be moved up and down within sleeve 2 until the appropriate holes 12 and 24 are aligned. Pin 30 is reinserted to hold shank 20 within sleeve 2. Since the counter-balance spring 26 supports the weight of the wheel assembly, the pin may be removed without the assembly dropping to the ground and one worker may conveniently raise or lower the wheel by sliding shank 20 within sleeve 2.

It will be apparent to those skilled in the art that various modifications may be made in the counter-balance spring assembly of the present invention without departing from the scope of the appended claims. Therefore, the foregoing description of the preferred embodiment as well as the illustrations, are to be viewed as illustrative and not in a limiting sense.

What is claimed:

1. A soil tillage apparatus comprising:

a frame having means thereon to releasably attach said frame to the three-point hitch of a tractor;

a plurality of shanks attaching to and extending down from said frame, each said shank having a replaceable, angled plough share attached to a soil engaging end thereof;

a plurality of circular coulters attached to and extending down from said frame, one of each said coulters disposed in front of one of each said shanks;

one or more gauge wheels adjustably connected to and depending from said frame so that each said wheel can be vertically adjusted to change the distance of the frame to the soil in use so as to change the depth that said coulters and shanks engage the soil;

means for connecting each said gauge wheel to the said frame, said means comprising a length of sleeve rigidly secured to said frame, said sleeve being secured at an angle approximating the vertical;

a shank having one of said gauge wheels rotatably secured to its lower end, said shank being slidably received within said sleeve, locking means interconnecting between the sleeve and the adjusted shank to provide for fixing the adjusted gauge wheel with respect to the ground;

a counterbalanced spring assembly operatively connected between each said gauge wheel and said frame to counterbalance said wheel when said wheel is being vertically adjusted to that said spring supports the weight of said wheel during vertical adjustment of said wheel, said counterbalance spring connecting at its upper end approximate the upper end of said sleeve, said counterbalance spring connecting at its lower end approximate the lower end of said shank, and providing a counterbalancing effect between the supported gauge wheel and the frame, said spring generally arranged in parallel alignment with the sleeve supported shank when disposed in its counterbalancing supporting position.

2. The soil tillage apparatus of claim 1 wherein said shank having a series of horizontally disposed holes provided therethrough, said sleeve having a series of horizontally disposed holes provided therethrough, and a pin disposed for inserting through the aligned holes, such that when a hole of the shank is aligned with the holes of the sleeve during adjustment of the gauge wheel the pin inserts therethrough for locking the gauge wheel at its adjusted setting.

* * * * *